US008094345B2

(12) United States Patent
Hashizume

(10) Patent No.: US 8,094,345 B2
(45) Date of Patent: Jan. 10, 2012

(54) IMAGE FORMING APPARATUS AND IMAGE FORMING METHOD SPECIFYING READ START POSITION OF WHITE REFERENCE PLATE

(75) Inventor: Yusuke Hashizume, Urayasu (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 933 days.

(21) Appl. No.: 11/786,548

(22) Filed: Apr. 12, 2007

(65) Prior Publication Data

US 2008/0252941 A1 Oct. 16, 2008

(51) Int. Cl.
*H04N 1/40* (2006.01)
*H04N 1/04* (2006.01)

(52) U.S. Cl. .......................................... 358/461; 358/474
(58) Field of Classification Search .................. None
See application file for complete search history.

(56) References Cited

U.S. PATENT DOCUMENTS

| 6,292,269 | B1 * | 9/2001 | Kawai ............................. 358/1.9 |
| 6,563,938 | B1 * | 5/2003 | Harada ........................... 382/108 |
| 6,700,683 | B1 * | 3/2004 | Hashizume .................... 358/461 |
| 6,771,397 | B2 | 8/2004 | Hashizume |
| 2004/0174575 | A1 | 9/2004 | Ide et al. |
| 2005/0179954 | A1 * | 8/2005 | Arai et al. .................... 358/3.26 |
| 2006/0170990 | A1 * | 8/2006 | Ishido et al. .................. 358/498 |

FOREIGN PATENT DOCUMENTS

| JP | 09-149217 | 6/1997 |
| JP | 9-294207 | 11/1997 |
| JP | 2001-285593 | 10/2001 |
| JP | 2001313793 | 11/2001 |
| JP | 2002368964 | 12/2002 |
| JP | 2006-211054 | 8/2006 |

OTHER PUBLICATIONS

Japanese Office Action dated Nov. 15, 2011, filed in Japanese counterpart Application No. 2008-100715, 13 pages (with English translation).

* cited by examiner

*Primary Examiner* — King Poon
*Assistant Examiner* — Ming Hon
(74) *Attorney, Agent, or Firm* — Patterson & Sheridan, LLP

(57) ABSTRACT

An image forming apparatus to generate image data from an original document and to form an image includes a photoelectric conversion unit to sequentially convert an image of the original document scanned in a sub-scanning direction into image signals made of a plurality of pixels constituting one line in a main scanning direction, a white reference plate which is white reference for the image signals, a white reference signal generation unit to generate a white reference signal from image signals obtained by photoelectric converting an image for a given number of lines from a given read start position of the white reference plate in the sub-scanning direction by the photoelectric conversion unit, a shading correction unit to correct the image signals of the original document image photoelectric converted by the photoelectric conversion unit based on the white reference signal, and a read start position acquisition unit to calculate and acquire the read start position on the white reference plate, and the read start position acquisition unit includes a start position calculation unit to detect a portion of the white reference plate where brightness is within a given range and to calculate the read start position.

12 Claims, 9 Drawing Sheets

IMAGE FORMING APPARATUS AND IMAGE FORMING METHOD SPECIFYING READ START POSITION OF WHITE REFERENCE PLATE

BACKGROUND OF THE INVENTION

1. Field of the Invention

The invention relates to an image forming apparatus which reads an original document by using a photoelectric conversion element and forms an image.

2. Description of the Related Art

An image forming apparatus is provided with an image reading device to read an original document image by using a CCD sensor. This image reading device corrects high-frequency distortion in an image signal, low-frequency distortion, and distortion of light-emitting characteristic. The high-frequency distortion is the distortion caused by variations in sensitivity of photoelectric conversion sensors corresponding to respective pixels constituting the CCD sensor. The low-frequency distortion is the distortion caused by an optical system to guide light from the original document to the CCD sensor. The distortion of light-emitting characteristic is the distortion (uneven light emission) of the light irradiated to the original document from a light source. In order to correct these distortions and unevenness, in the image forming and reading apparatus, a shading correction is generally performed on an output signal of the CCD sensor.

In this shading correction, an image signal is corrected using a black reference signal which is black reference and a white reference signal which is white reference. Especially, the white reference signal is acquired by reading an image of a white reference member by a CCD sensor (JP-A-9-294207). Thus, in the case where foreign matter such as a flaw or a contamination is attached to a part of the white reference member, an image of the foreign matter is read as the white reference. In this case, at the position corresponding to the foreign matter, the white reference signal has a value different from a desired value. As a result, a white streak-like image can appear on a read image of an original document.

BRIEF SUMMARY OF THE INVENTION

An image forming apparatus according to a first aspect of the invention is an image forming apparatus to generate image data from an original document and to form an image, and includes a photoelectric conversion unit configured to sequentially convert an image of the original document scanned in a sub-scanning direction into image signals made of a plurality of pixels constituting one line in a main scanning direction, a white reference plate which is white reference of the image signals, a white reference signal generation unit configured to generate a white reference signal from image signals obtained by photoelectric converting an image of a given number of lines from a given read start position of the white reference plate in the sub-scanning direction by the photoelectric conversion unit, a shading correction unit configured to correct the image signals of the original document image photoelectric converted by the photoelectric conversion unit based on the white reference signal, and a read start position acquisition unit configured to calculate and acquire the read start position on the white reference plate, and the read start position acquisition unit includes a start position calculation unit configured to detect a portion of the white reference plate where brightness is within a given range and calculates the read start position.

An image forming method according to a second aspect of the invention is an image forming method of an image forming apparatus which includes a photoelectric conversion unit to sequentially convert an image of an original document scanned in a sub-scanning direction into image signals made of a plurality of pixels constituting one line in a main scanning direction and generates image data from the original document and forms an image, the method comprising arranging a white reference plate which is white reference of the image signals, detecting a portion of the white reference plate where brightness is within a given range to calculate a read start position on the white reference plate, generating a white reference signal from image signals obtained by photoelectric converting an image of a given number of lines from the read start position of the white reference plate in the sub-scanning direction by the photoelectric conversion unit, and correcting the image signals of the original document image photoelectric converted by the photoelectric conversion unit based on the white reference signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, embodiments of the invention will be described with reference to the drawings.

Figure 1:
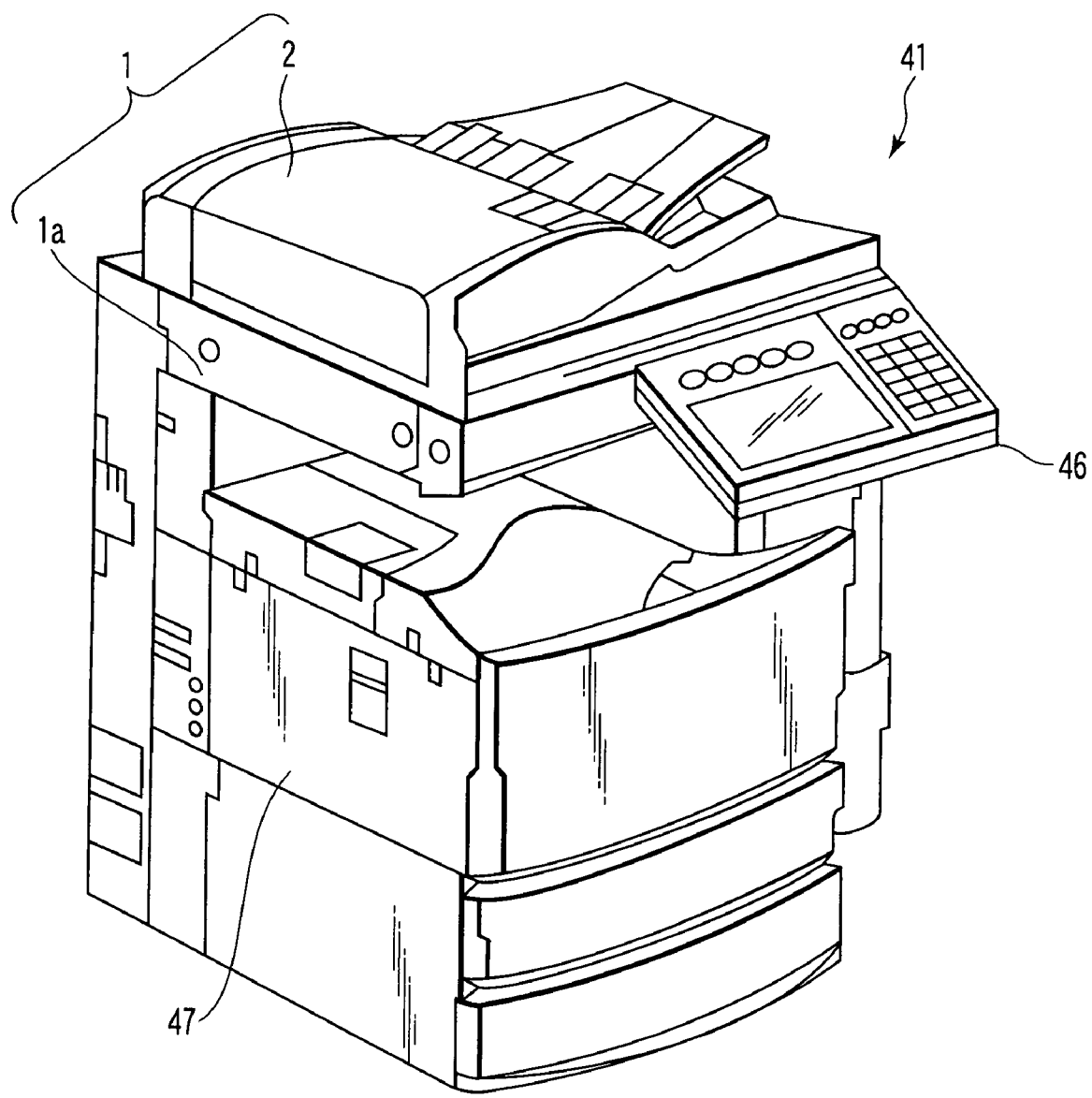
FIG. 1 is a perspective view showing a rough shape of an image forming apparatus including an image reading device.

FIG. 1 is a perspective view showing a rough shape of an image forming apparatus including an image reading device.

The image forming apparatus 41 includes the image reading device 1, an image forming unit 47 and a control panel 46. The image reading device 1 includes an image reading unit 1a and an automatic document feeder 2.

The image reading device 1 is the device to read image information of an original document at each line and in units of pixels corresponding to resolution. The image reading unit 1a captures the image information as image data from the original document. The automatic document feeder 2 guides the original document to a read position, and discharges the original document reading of which has been finished from the read position to a discharge position. The image forming unit 47 outputs the image information as an output image called, for example, hard copy or printout. The control panel 46 is an instruction input unit to instruct the operation of the image forming apparatus 41 such as the start of image formation in the image forming unit 47 or the start of reading of the image information of the original document by the image reading unit 1a. The control panel 46 includes a hard key to input instructions, an LCD to display information to an operator, and the like.

The image forming apparatus 41 is connected to a not-shown network or communication line, and can receive image data by FAX, E-mail or the like.

Figure 2:
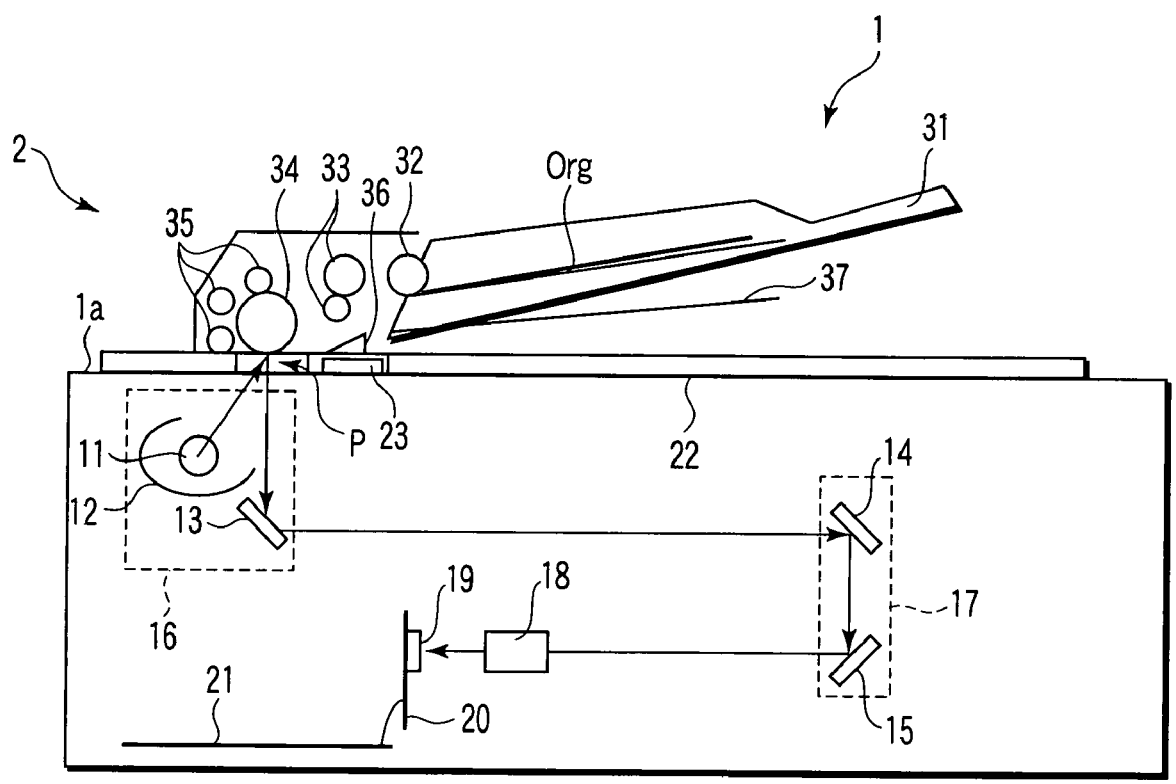
FIG. 2 is a sectional view showing a structure of the image reading device.

FIG. 2 is a sectional view showing a structure of the image reading device 1 of the embodiment of the invention. The image reading device 1 shown in FIG. 2 includes the image reading unit 1a and the automatic document feeder (ADF) 2.

First, the structure of the image reading unit 1a will be described.

As shown in FIG. 2, the image reading unit 1a includes a light source 11, a reflector 12, a first mirror 13, a second mirror 14, a third mirror 15, a first carriage 16, a second carriage 17, a condensing lens 18, a CCD sensor 19, a CCD board 20, a scanner control board 21, a document stand glass 22, a shading correction plate 23 as a white reference plate, and the like.

The light source 11 emits light to irradiate an original document Org. The reflector 12 uniformly irradiates the light emitted from the light source 11 to the original document Org. That is, the reflector 12 adjusts the light-emitting characteristic at the read position of the original document Org. The first mirror 13 receives reflected light from the original document Org. The first mirror 13 is disposed to guide the reflected light from the original document Org to the second mirror 14.

The second mirror 14 receives the reflected light from the first mirror 13. The second mirror 14 is disposed to guide the reflected light from the first mirror 13 to the third mirror. The third mirror 15 receives the reflected light from the second mirror 14. The third mirror 15 is disposed to guide the reflected light from the second mirror 14 to the condensing lens 18. The condensing lens 18 condenses the reflected light from the third mirror. The condensing lens 18 is disposed to condense the reflected light from the third mirror and to form an image on an imaging surface of the CCD sensor 19.

The CCD sensor 19 is mounted on the CCD board 20. The CCD sensor 19 performs photoelectric conversion to convert the light energy, which is imaged by the condensing lens 18, into an electric charge. By this, the CCD sensor 19 converts the image imaged by the condensing lens 18 into an electric signal. The CCD board 20 outputs the electric signal photoelectric converted by the CCD sensor 19 to the scanner control board 21.

The document stand glass 22 is a document mounting stand on which the original document Org is mounted. The shading correction plate 23 is made of a white member. The shading correction plate 23 becomes white reference for correcting a read image of the original document.

Besides, the light source 11, the reflector 12 and the first mirror 13 are mounted on the first carriage 16. The second mirror 14 and the third mirror 15 are mounted on the second carriage 17. The first carriage 16 is constructed to be moved in the horizontal direction by not-shown drive means. The second carriage 17 is constructed to be driven in the same direction as the first carriage 16 at a half speed. By this, even if the first carriage 16 is moved, the light path length of the light guided from the original document surface to the imaging surface of the CCD sensor 19 is not changed.

That is, the optical system including the first mirror 13 mounted on the first carriage 16, the second mirror 14 mounted on the second carriage 17, and the third mirror 15 mounted on the second carriage is constructed so that the light path length from the original document surface to the imaging surface of the CCD sensor 19 always becomes constant.

For example, in the case where the image of the original document mounted on the document stand glass 22 is read, the first carriage 16 is moved in the sub-scanning direction, that is, in the direction from left to the right in FIG. 2. In accordance with the movement of the first carriage 16 in the sub-scanning direction, the read position (for one line in the main scanning direction) P to the original document Org is also moved in the direction from the left to the right (sub-scanning direction). The read position is moved in the sub-scanning direction, so that an image (image for one line in the main scanning direction) of the original document Org at the read position is sequentially formed on the imaging surface of the CCD sensor 19. By this, the CCD sensor 19 converts the image of the whole original document into image information.

Plural photodiodes are one-dimensionally arranged on the imaging surface of the CCD sensor 19. By the plural photodiodes arranged one-dimensionally, the CCD sensor 19 reads the image for one line in the main scanning direction. For example, in the case where A4 of 297 mm in the longitudinal direction is read at a resolution of 600 dpi (dot per inch), the CCD sensor 19 requires at least 297 mm/(25.4 mm/600 dpi)=7015.7 photodiodes. In the case where the resolution is 600 dpi, the CCD sensor 19 is generally constructed of 7300 to 7600 photodiodes in view of front and back margins.

However, there is a case where the efficiencies of the photoelectric conversion of the respective photodiodes constituting the CCD sensor 19 are not completely uniform. That is, there can occur a case where the respective photodiodes constituting the CCD sensor 19 output signals of different amplitudes even for the same amount of exposure. Such a phenomenon is called the high-frequency distortion.

Besides, in the structure shown in FIG. 2, there is a case where the low-frequency distortion occurs in which the amount of light is reduced at both ends of the read position P as compared with the center part. The low-frequency distortion occurs by variations in the amount of light emitted from the light source 11, the characteristic of the reflector 12, the reduction of the amount of light in the optical system from the original document surface to the imaging surface of the CCD sensor 19, and the like. Especially, in the image reading device with the structure shown in FIG. 2, a reduction optical system is used as the optical system. In the reduction optical system as stated above, the amount of light is often reduced at both ends of the read image (image for one line in the main scanning direction) as compared with the center part due to the condensing mirror 18.

It is difficult to completely remove the high-frequency distortion and the low-frequency distortion. Thus, in the image reading device, a shading correction to correct the high-frequency distortion or the low-frequency distortion is performed. In the shading correction, the output signal of the CCD sensor 19 is corrected based on, for example, an image signal (black reference signal) as black reference and an image signal (white reference signal) as white reference.

For example, it is assumed that the number of effective bits of the image signal outputted by the CCD sensor 19 is 8 bits. In this case, in the shading correction, the output signals (respective pixels) of the respective photodiodes constituting the CCD sensor 19 are normalized so that the black reference signal becomes "0" and the white reference signal becomes "255".

The black reference signal is the output signal of each of the photodiodes constituting the CCD sensor 19 in the state where the light source 11 is turned off, that is, the light incident on the CCD sensor 19 is eliminated. The white reference signal is the signal outputted by each of the photodiodes constituting the CCD sensor 19 in the state where the light source 11 is turned on while the shading correction plate 23 is placed at the read position P. That is, the white reference signal is the output signal of the CCD sensor 19 when the image of the shading correction plate 23 is read while the light source 11 is turned on. Incidentally, the shading correction will be described later in detail.

Next, the structure of the automatic document feeder (ADF) 2 will be described.

The automatic document feeder (ADF) 2 includes a document tray 31, a pickup roller 32, a resist roller pair 33, a conveyance drum 34, conveyance rollers 35, a jump stand 36, a document discharge unit 37 and the like.

The document tray 31 is the tray on which the original document Org of the read object is stacked. The pickup roller 32 picks up the original document Org stacked on the document tray 31 one by one, and supplies it to the resist roller pair 33. The resist roller pair 33 conveys the original document Org picked up by the pickup roller 32 to the conveyance drum 34. The resist roller pair 33 corrects the inclination of the original document Org, and conveys the original document Org while preventing overlapping conveyance of the original documents Org.

The conveyance drum 34 and the conveyance rollers 35 convey the original document Org conveyed from the resist roller pair 33. The conveyance drum 34 presses the read surface of the original document Org to the surface of the document stand glass at the read position P and conveys it. The jump stand 36 is a member to guide the original document Org conveyed by the conveyance drum 34 and the conveyance rollers 35 to the document discharge unit 37. The document discharge unit 37 stacks the original document Org to be discharged.

Next, a description will be given to a structural example of the image forming apparatus 41 provided with the image reading device as stated above and a system including the image forming apparatus 41.

Figure 3:
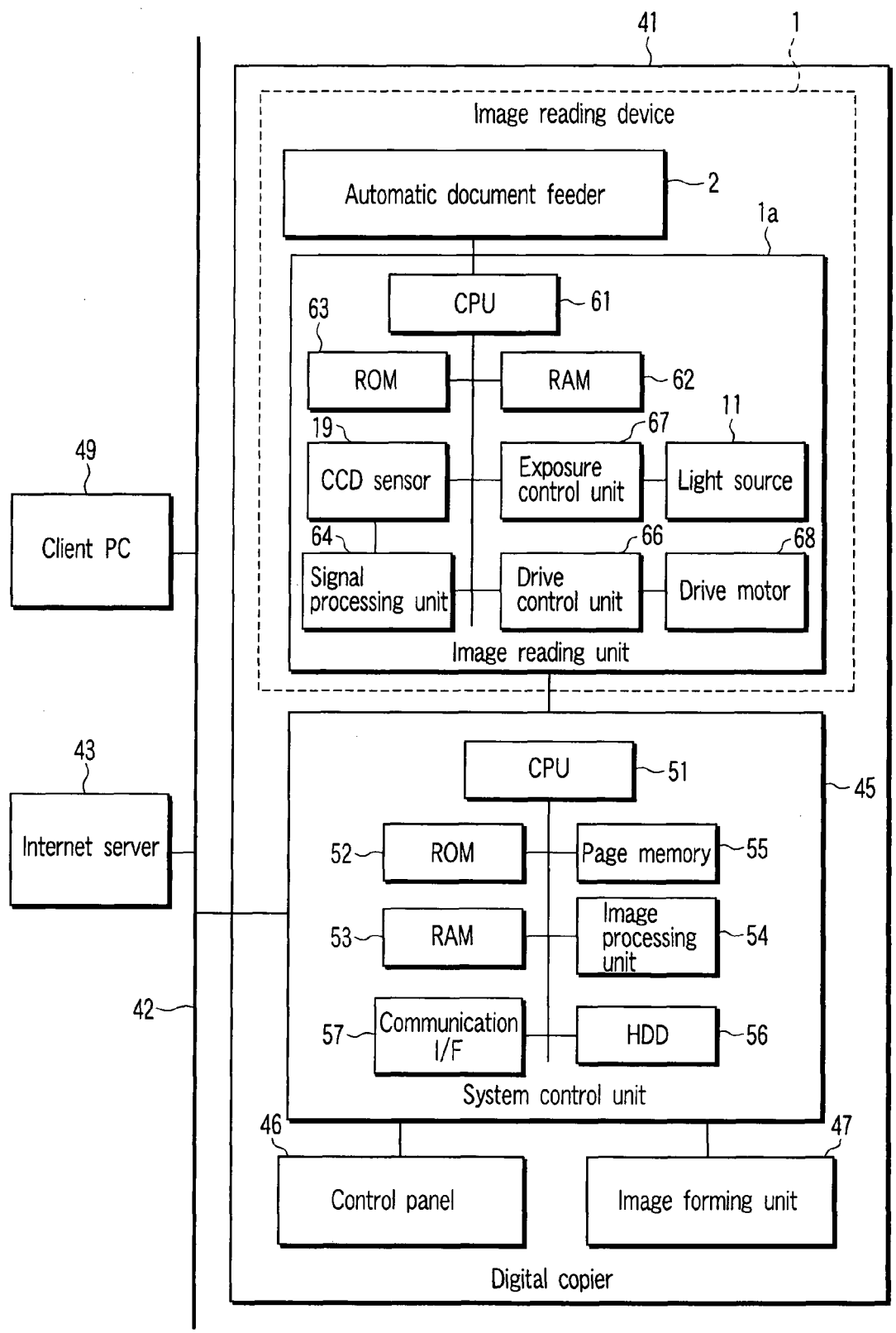
FIG. 3 is a block diagram showing a structural example of the image forming apparatus including the image reading device and a structural example of a network system including the image forming apparatus.

FIG. 3 is a block diagram showing a structural example of a control system in the image reading unit 1a, a structural example in the image forming apparatus 41, and a structural example of the network system including the image forming apparatus 41.

As shown in FIG. 3, the image forming apparatus 41 is connected to an internet server 43 and a client PC 49 through a network 42. Besides, the image forming apparatus 41 includes a system control unit 45, a control panel 46, an image forming unit 47, an image reading unit 1a, an automatic document feeder 2, and the like.

The network 42 is, for example, a local area network. The internet server 43 is a server apparatus for connecting with another network, such as the Internet, from an equipment connected to the network 42. The internet server 43 is managed by, for example, a center (not shown) to provide maintenance of the image forming apparatus 41 or service relating to the image forming apparatus 41.

For example, in the case where a defect occurs in the image forming apparatus 41, the internet server 43 is notified by the image forming apparatus 41 that the defect occurs. When the defect is notified to the internet server 43, the center to provide the service to the image forming apparatus 41 dispatches a person (here, called a service man) having special knowledge of maintenance and the like. The service system is realized such that the service man performs the maintenance of the image forming apparatus 41 by this.

The system control unit 45 controls the whole image forming apparatus 41. The system control unit 45 includes a CPU 51, a ROM 52, a RAM 53, an image processing unit 54, a page memory 55, a hard disk drive (HDD) 56, a communication interface (I/F) 57 and the like.

The CPU 51 controls the whole system control unit 45. The ROM 52 is a nonvolatile memory. For example, a control program and control data are stored in the ROM 52. The RAM 53 is a volatile memory. For example, various parameters, working data and the like are stored in the RAM 53. The image processing unit 54 performs an image processing on image data. The communication interface 57 is the interface to perform data communication with an external equipment through the network 42.

The control panel 46 is a user interface to which various operation instructions are inputted. The control panel 46 includes, for example, a liquid crystal display device having a built-in touch panel, a hard key, such as a numeric keypad, and the like. The image forming unit 47 is a printer to form an image corresponding to image data supplied from the system control unit 45 on an image-formed medium.

Next, the operation of the image forming apparatus structured as stated above will be roughly described.

First, the user inputs a copy instruction from the control panel 46. When receiving the copy instruction from the control panel 46, the CPU 51 of the system control unit 45 outputs a read instruction of an original document image to the image reading device 1. The image reading device 1 performs a reading processing of the original document image in accordance with the read instruction of the original document image from the system control unit 45. The image data of the original document read by the reading processing of the original document image is supplied from the image reading device 1 to the system control unit 45.

The system control unit 45 converts the format of the image data supplied from the image reading device 1 into a format for image formation by the image processing unit 54. The format for image formation is the format in which the image forming unit 47 performs the image formation processing. When the format of the image data of the original document read by the image reading device 1 is converted into the format for the image formation, the system control unit 45 outputs the image data at a given timing to the image forming unit 47. The image forming unit 47 forms the image corresponding to the image data supplied from the system control unit 45 on the image-formed medium. For example, the image forming unit 47 forms the image on the sheet by the xerographic system.

Besides, the user instructs scanning of the original document image and transferring of the image data of the original document by the control panel 46. In this case, the CPU 51 of the system control unit 45 outputs the read instruction of the original document image to the image reading device 1. The image reading device 1 performs the reading processing of the original document image in accordance with the read instruction of the original document image from the system control unit 45. The image data of the original document read by this reading processing of the original document image is supplied from the image reading device 1 to the system control unit 45.

The CPU 51 of the system control unit 45 receives the image data read by the image reading device 1 and temporarily stores it in the HDD or the like. At this time, the CPU 51 converts the image data into a desired format by the image processing unit 54. When the image data read by the image reading device 1 is stored in the HDD, the CPU 51 transfers the image data to the desired client PC 49 through the network 42 by the communication interface 57.

The image forming apparatus 41 has a function (network printer function) to print image data from the client PC 49 connected to the network 42. For example, the system control unit 45 receives a print request as a signal for print output and image data for print output from the client PC 49 connected to the network 42 by the communication interface 57. In this case, the system control unit 45 temporarily stores the image data for print output received from the client PC 49 into the HDD or the like. At this time, the system control unit 45 converts the format of the received image data into the format for image formation by the image forming unit 47. Further, the system control unit 45 outputs the image data converted into the format for image formation to the image forming unit 47 at a given timing. The image forming unit 47 forms the image corresponding to the image data supplied from the system control unit 45 on the image-formed medium.

The system control unit 45 has also a function to perform data communication with an external device through the network 42 and the Internet as an external network. For example, the system control unit 45 has a function to transmit the image data to the external device through the network 42 and the Internet. Besides, the system control unit 45 has a function to transmit information indicating the present state of the image forming apparatus 41 to an external apparatus on the Internet.

Next, the structure of the control system of the image reading unit 1a will be described.

The control system of the image reading device is provided on, for example, the control board 21 of the image reading unit 1a. As shown in FIG. 3, a CPU 61, a RAM 62, a ROM 63, a signal processing unit 64, a drive control unit 66, an exposure control unit 67 and the like are provided on the control board 21 of the image reading unit 1a.

The CPU 61 controls the whole image reading unit 1a. The RAM 62 is constructed of a volatile memory. The ROM 63 is constructed of a nonvolatile memory. The ROM 63 stores a control program executed by the CPU 61, control data and the like. For example, the ROM 63 stores coordinate values indicating positions of the first carriage 16 corresponding to the read position of black reference, the read position of white reference (details will be described later), the read position of the original document conveyed by the ADF 2, and the like.

The signal processing unit 64 processes the image data as the output signal from the CCD sensor 19. The signal processing unit 64 performs a processing such as, for example, an analog-digital conversion processing, a shading correction processing, or an image correction processing. The drive control unit 66 performs driving control of a drive motor 68 to drive the first carriage 16 in the image reading unit 1a. The exposure control unit 67 performs lighting control of the light source 11.

Next, the reading operation of an original document image using the automatic document feeder (ADF) 2 will be described.

Figure 4:
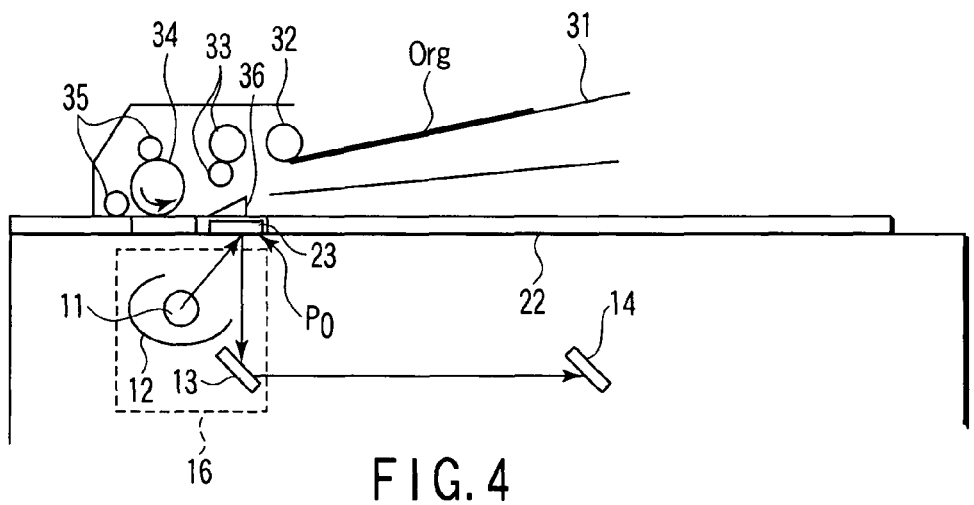
FIG. 4 is a view showing the image reading device when a white reference signal is read.
Figure 5:
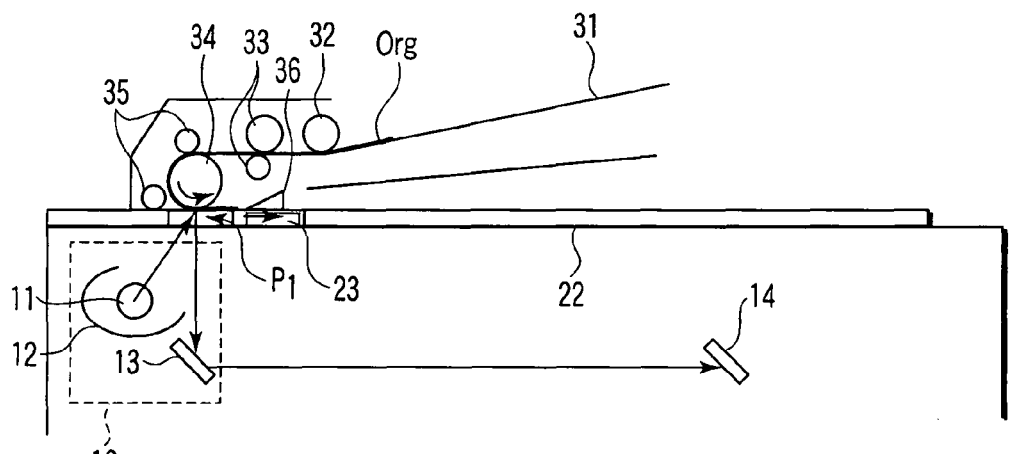
FIG. 5 is a view showing the image reading device during reading of an image of an original document conveyed by an ADF.
Figure 6:
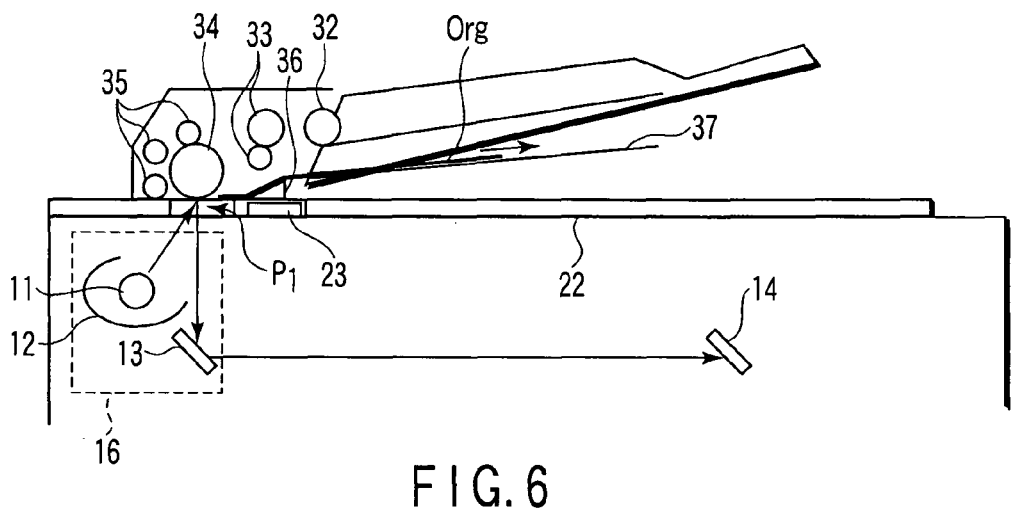
FIG. 6 is a view showing the image reading device after the reading of the original document image.

FIG. 4 is a view showing the image reading device when the white reference signal is read. FIG. 5 is a view showing the image reading device during the reading of an image of an original document conveyed by the ADF 2. FIG. 6 is a view showing the image reading device after the reading of the original document image.

First, in the case where the reading processing of the original document image is performed using the ADF 2, the image reading device sequentially performs the reading processing of the black reference signal, the reading processing of the white reference signal, and the reading processing of the original document image. In the reading processing of the black reference signal (black reference reading processing), the light source 11 is brought into the lighting-off state, and the image as the black reference is read. In the reading processing of the white reference signal, the light source 11 is turned on and the image of the shading correction plate 23 is read. In the reading processing of the original document image, the original document image conveyed by the ADF 2 is read at a given read position P1.

That is, the CPU 61 sequentially performs the reading processing of the black reference signal (black reference reading processing), the reading processing of the white reference signal (white reference reading processing) and the reading processing of the original document image (original document reading processing).

First, as the reading processing of the black reference signal, the CPU 61 brings the light source 11 into the lighting-off state by the exposure control unit 67, and reads the black reference for a given time while the first carriage 16 remains stopped. During this, the CCD sensor 19 outputs the signal as the black reference. That is, the CCD sensor 19 reads as the black reference image the image for several lines in the state where the light source 11 is turned off. Besides, the signal processing unit 64 processes the output signals (black reference image) for several lines outputted from the CCD sensor 19 and obtains an average value for the respective pixels, and the value is made the black reference signal.

Next, the CPU 61 performs the reading processing of the white reference signal. As the white reference reading processing, the CPU 61 brings the light source 11 into the lighting-on state by the exposure control unit 67, and drives the drive motor 68 by the drive control unit 66 to move the first carriage 16 to a shading start position P0 for white reference ADF original document reading. The shading start position P0 for ADF original document reading shown in FIG. 4 indicates the read position of the first carriage 16 to the shading correction plate 23.

When the first carriage 16 is moved to the shading start position P0 for white reference ADF original document reading, the CPU 61 moves the first carriage 16 by a given number of lines in the left direction, that is, in the sub-scanning direction by the drive control unit 66, while the light source 11 is kept in the lighting-on state. During this, the CCD sensor 19 outputs the signal as the white reference. That is, the CCD sensor 19 reads as the white reference image the image for given several lines of the shading correction plate 23 in the state where the light source 11 is turned on. The signal processing unit 64 processes the output signals (white reference image) for the several lines from the CCD sensor 19 and obtains an average value for the respective pixels, and the value is made the white reference signal.

Next, the CPU 61 performs the reading processing of the original document image. As the original document reading processing, the CPU 61 drives the drive motor 68 by the drive control unit 66 to move the first carriage 16 to the ADF original document read position P1 while the light source 11 is kept in the lighting-on state by the exposure control unit 67. The ADF original document read position P1 shown in FIG. 5 and FIG. 6 indicates the read position to the original document conveyed by the ADF 2.

On the other hand, the CPU 61 instructs the ADF 2 to start the conveyance of the original document. The ADF 2 starts the conveyance of the original document Org on the original document tray 31 in accordance with the instruction from the CPU 61. The original document Org on the original document tray 31 is picked up by the pickup roller 32 one by one. The leading end of the original document Org picked up by the pickup roller 32 is conveyed to the resist roller pair 33. A sensor (not shown) to detect that the original document has arrived to this side of the resist roller pair 33 is installed at this side of the resist roller pair 33.

The original document Org, whose arrival to this side of the resist roller pair 33 is detected by the sensor, is conveyed to the latter stage by the resist roller pair 33 according to the timing instructed from the CPU 61. At the latter stage of the resist roller pair 33, the original document Org is conveyed by the conveyance drum 34 and the conveyance rollers 35. The original document Org conveyed by the conveyance drum 34 and the conveyance rollers 35 is guided to the original document discharge unit 37 by the jump stand 36 as shown in FIG. 6.

Besides, at the ADF original document read position P1, as shown in FIG. 5, the light from the light source 11 is irradiated onto the original document through the document stand glass 22, and the reflected light is incident on the first mirror 13. The light reflected from the original document and incident on the first mirror 13 is incident on the CCD sensor 19 through the optical system including the second mirror, the third mirror, the condensing mirror and the like. That is, with respect to the original document Org conveyed by the ADF 2, the image in the main scanning direction is sequentially read at the ADF original document read position P1. Besides, the output signal from the CCD sensor 19, which is the image information photoelectric-converted by the CCD sensor 19, is corrected by the signal processing unit 64 using the black reference signal and the white reference signal.

Next, the reading operation of the original document image mounted on the document stand glass 22 will be described.

Figure 7:
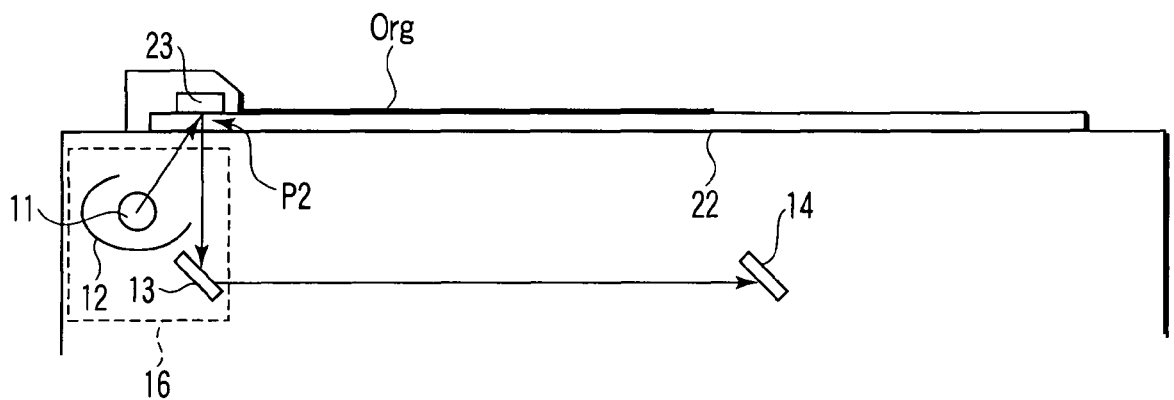
FIG. 7 is a view showing the image reading device when a white reference signal is read.
Figure 8:
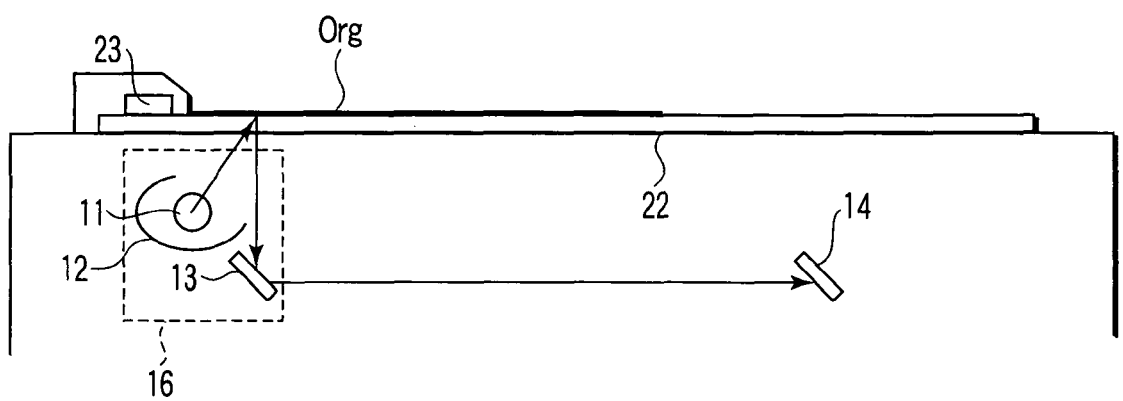
FIG. 8 is a view showing the image reading device during reading of an image of an original document mounted on a document stand glass.

FIG. 7 is a view showing the image reading device when the white reference signal is read. FIG. 8 is a view showing the image reading device during the reading of the image of the original document mounted on the document stand glass 22.

In the case where the reading processing of the original document image mounted on the document stand glass 22 is performed, similarly to the foregoing processing using the ADF 2, the image reading device sequentially performs the reading processing of the black reference signal, the reading processing of the white reference signal, and the reading processing of the original document image. In the reading processing of the black reference signal (black reference reading processing), the light source 11 is brought into the lighting-off state and the image as black reference is read. In the reading processing of the white reference signal, the light source 11 is turned on, and the image as the white reference of the shading correction plate 23 is read. In the reading processing of the original document image, the original document image is read while the first carriage 16 is moved in the sub-scanning direction, that is, in the direction from left to right in FIG. 2.

First, as the reading processing of the black reference signal, the CPU 61 brings the light source 11 into the lighting-off state by the exposure control unit 67, and reads the black reference for a given time while the first carriage 16 remains stopped. During this, the CCD sensor 19 outputs the signal as the black reference. That is, the CCD sensor 19 reads as the black reference image the image for several lines in the state where the light source 11 is turned off. Besides, the signal processing unit 64 processes the output signals (black reference image) for the several lines outputted from the CCD sensor 19 and obtains an average value for the respective pixels, and the value is made the black reference signal.

Next, the CPU 61 performs the reading processing of the white reference signal. As the white reference reading processing, the CPU 61 brings the light source 11 into the lighting-on state by the exposure control unit 67, drives the drive motor 68 by the drive control unit 66, and moves the first carriage 16 to a white reference shading start position P2 for fixed original document reading. The shading start position P2 for fixed original document reading shown in FIG. 7 indicates the read position of the first carriage 16 to the shading correction plate 23.

When the first carriage 16 is moved to the white reference shading start position P2 for fixed original document reading, the CPU 61 moves the first carriage 16 by a given number of lines in the right direction, that is, in the sub-scanning direction by the drive control unit 66, while the light source 11 is kept in the lighting-on state. During this, the CCD sensor 19 outputs the signal as the white reference. That is, the CCD sensor 19 reads as the white reference image the image for a given number of lines of the shading correction plate 23 in the state where the light source 11 is turned on. Besides, the signal processing unit 64 processes the output signals (white reference image) for the several lines from the CCD sensor 19 and obtains an average value for the respective pixels, and the value is made the white reference signal.

Next, the CPU 61 performs the reading processing of the original document image. As the original document reading processing, the CPU 61 drives the drive motor 68 by the drive control unit 66 and moves the first carriage 16 to the read start position of the original document, while the light source 11 is kept in the lighting-on state by the exposure control unit 67.

The CPU 61 instructs the reading of the original document. FIG. 8 shows a state during the original document reading. The first carriage 16 moves in the sub-scanning direction, that is, in the direction from left to right in FIG. 8. In accordance with the movement of the first carriage 16 in the sub-scanning direction, the read position (for one line in the main scanning direction) P to the original document Org is also moved in the direction from left to right (sub-scanning direction). The second carriage 17 is driven in the same direction as the first carriage 16 at a half speed. By this, even if the first carriage 16 is moved, the light path length of the light guided from the original document surface to the imaging surface of the CCD sensor 19 is not changed.

The read position is moved in the sub-scanning direction, so that the image (image for one line in the main scanning direction) of the original document Org at the read position is sequentially imaged on the imaging surface of the CCD sensor 19. By this, the CCD sensor 19 converts the image of the whole original document into image information.

Next, the signal processing unit 64 will be described.

Figure 9:
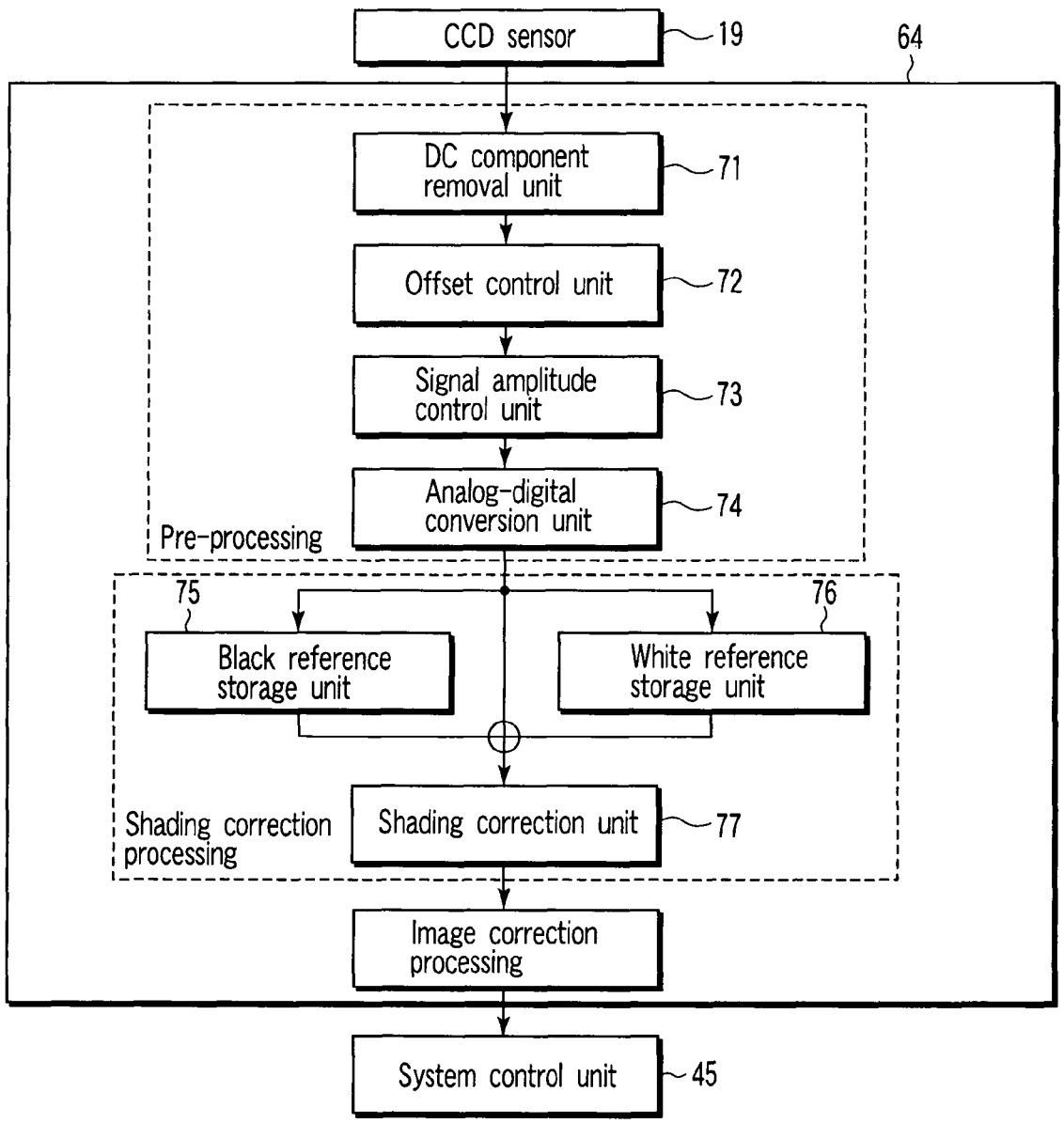
FIG. 9 is a block diagram showing a structural example in a signal processing unit.

FIG. 9 is a block diagram showing a structural example in the signal processing unit 64.

As shown in FIG. 9, the signal processing unit 64 performs a pre-processing, a shading correction processing, and an image correction processing. The pre-processing is the processing on the output signal of the CCD sensor 19. The shading correction processing is the correction processing on the output signal of the CCD sensor 19 using the black reference signal and the white reference signal. The image correction processing is the correction processing on the image data as the output signal of the CCD sensor 19.

First, the pre-processing of the signal processing unit 64 will be described.

The pre-processing of the signal processing unit 64 is performed by a DC component removal unit 71, an offset control unit 72, a signal amplitude control unit 73, and an analog-digital conversion unit 74.

First, the output signal from the CCD sensor 19 includes a DC component of a DC output voltage. Thus, the DC component removal unit 71 removes the DC component included in the output signal from the CCD sensor 19. The DC component removal unit 71 is constructed of, for example, a capacitor inserted in series to the output signal of the CCD sensor 19.

Further, the output signal of the CCD sensor 19 includes an inductive noise and a reset noise due to a reset signal inputted to the CCD sensor 19. That is, the output signal of the CCD sensor 19 is not a signal of a constant level. Thus, the offset control unit 72 and the signal amplitude control unit 73 perform offset control and amplitude adjustment on the output signal of the CCD sensor 19.

The offset control unit 72 performs the offset control on the output signal of the CCD sensor 19. The offset control unit 72 controls the output signal of the CCD sensor 19 so that the potential of a preliminary feeding portion, which is not effective pixels of the CCD sensor 19, becomes a desired voltage.

The signal amplitude control unit 73 adjusts the amplitude of the output signal of the CCD sensor 19. The signal amplitude control unit 73 adjusts the amplitude of the offset-controlled signal so as to match with the input range of the analog-digital conversion unit 74.

The analog-digital conversion unit 74 is for converting an analog signal into a digital signal. The analog-digital conversion unit 74 converts the analog signal whose amplitude is adjusted by the signal amplitude control unit 73 into the digital signal.

By the pre-processing up to the analog-digital conversion unit 74, the output signal of the CCD sensor 19 is converted from the analog signal into the digital signal. Accordingly, in the signal processing unit 64, the output signal (image signal) of the CCD sensor 19 is processed as the digital signal in the processing subsequent to the analog-digital conversion unit 74.

Next, the shading correction processing in the signal processing unit 64 will be described.

The shading correction processing in the signal processing unit 64 is performed by a black reference storage unit 75, a white reference storage unit 76, and a shading correction unit 77. The black reference storage unit 75 stores the black reference signal to the output signal (image signal) of the CCD sensor 19. The black reference storage unit 75 is constructed of a memory and the like to store the black reference signal for each pixel. The white reference storage unit 76 stores the white reference signal to the output signal (image signal) of the CCD sensor 19. The white reference storage unit 76 is constructed of a memory and the like to store the white reference signal for each pixel. The shading correction unit 77 uses the black reference signal and the white reference signal to perform the correction on the read image (image signal) of the original document.

Next, the operation of the shading correction processing in the signal processing unit 64 will be described.

As described above, in the image reading device 1, the black reference reading processing, the white reference reading processing, and the original document reading processing are sequentially performed. In the shading correction processing, the output signal of the CCD sensor 19 as the image signal read by the original document reading processing is corrected by using the black reference signal obtained by the black reference reading processing and the white reference signal obtained by the white reference reading processing.

First, in the black reference reading processing, the reading of the black reference image for plural lines is performed in the state where the light source 11 is turned off, that is, in the state where light is not irradiated to the CCD sensor 19. At this time, the signal processing unit 64 performs the pre-processing on the output signal of the CCD sensor 19, and stores the image signal as a black reference signal Dbk into the black reference storage unit 75. Besides, the image signal as the black reference signal Dbk is averaged for the respective pixels and is stored in the black reference storage unit 75.

Next, in the white reference reading processing, the reading of the image (white reference image) of the shading correction plate 23 is performed in the state where the light source 11 is turned on. At this time, the signal processing unit 64 performs the pre-processing on the output signal of the CCD sensor 19, and stores the image signal as a white reference signal Dwt into the white reference storage unit 76. Besides, the image signal as the white reference signal Dwt is averaged for the respective pixels and is stored in the white reference storage unit 76.

Next, in the original document image reading processing, the first carriage 16 is moved to the read position of the original document image, and the reading processing of the original document image is performed. Here, as shown in FIG. 5 and FIG. 6, the case where the original document image is read using the automatic document feeder 2 will be described.

That is, after the image of the shading correction plate 23 is read, as shown in FIG. 5, the first carriage 16 is moved to the right and is stopped at the given ADF original document read position P1. On the other hand, in the automatic document feeder 2, the original document Org is conveyed according to the timing when the first carriage 16 is moved to the ADF original document read position P1. By this, the image of the original document Org conveyed by the automatic document feeder 2 is sequentially read for each line in the main scanning direction at the ADF original document read position P1. That is, the CCD sensor 19 sequentially outputs the image signal Dim for each line in the main scanning direction to the signal processing unit 64.

The signal processing unit 64 performs the pre-processing on the image signal Dim sequentially supplied from the CCD sensor 19, and performs the shading correction on the image signal Dim. The shading correction as stated above is executed by the shading correction unit 77 using the black reference signal Dbk stored in the black reference storage unit 75 and the white reference signal Dwt stored in the white reference storage unit 76.

For example, in the case where the number of effective bits of the image signal is 8 bits, the shading correction unit 77 calculates the image signal Dout after the shading correction by the following computation expression.

$$Dout=(Dim-Dbk)/(Dwt-Dbk)\times 255$$

Incidentally, in the case where the number of effective bits of the image signal as the signal after the shading correction is 10 bits, the constant "255" of the computation expression is substituted by "1023".

After this, the image correction processing in the signal processing unit 64 is executed in cooperation with the CPU 51 of the system control unit 45 and the image processing unit 54. The detailed description thereof will be omitted.

Next, a description will be given to a method of determining a shading start position P0 for ADF original document reading used in the shading correction operation, a shading start position P2 for fixed original document reading, and a given number of read lines for each of them.

Figure 10:
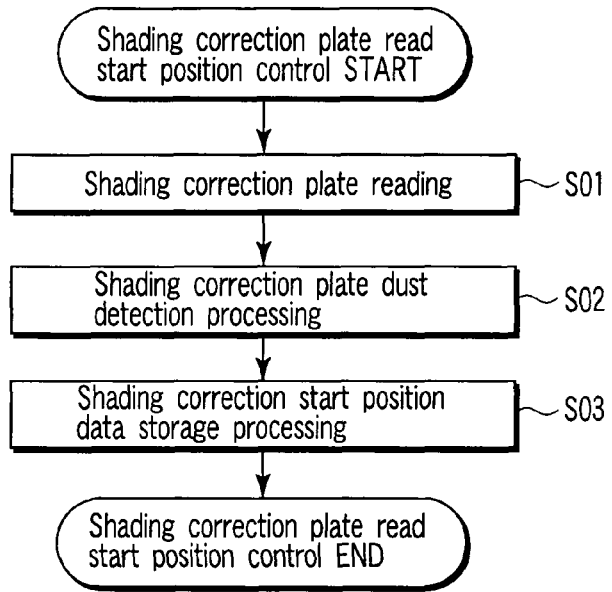
FIG. 10 is a flowchart showing the rough procedure of a shading correction plate read start position determination processing.

FIG. 10 is a flowchart showing the rough procedure of a shading correction plate read start position determination processing.

The start of this processing may be instructed, for example, from the control panel 46 by an operator in the manufacture line of the image forming apparatus 41, or may be instructed from the control panel 46 by a service man at the time of maintenance. Alternatively, the processing may be automatically performed when the operation has been performed for a given period of time since the delivery of the image forming apparatus 41.

Incidentally, this processing is performed by the shading correction plate read start position determination program stored in the ROM 63 of the image reading unit 1a.

When the operation start is instructed from the control panel 46, reading of the shading correction plate is executed at step S01.

Figure 11:
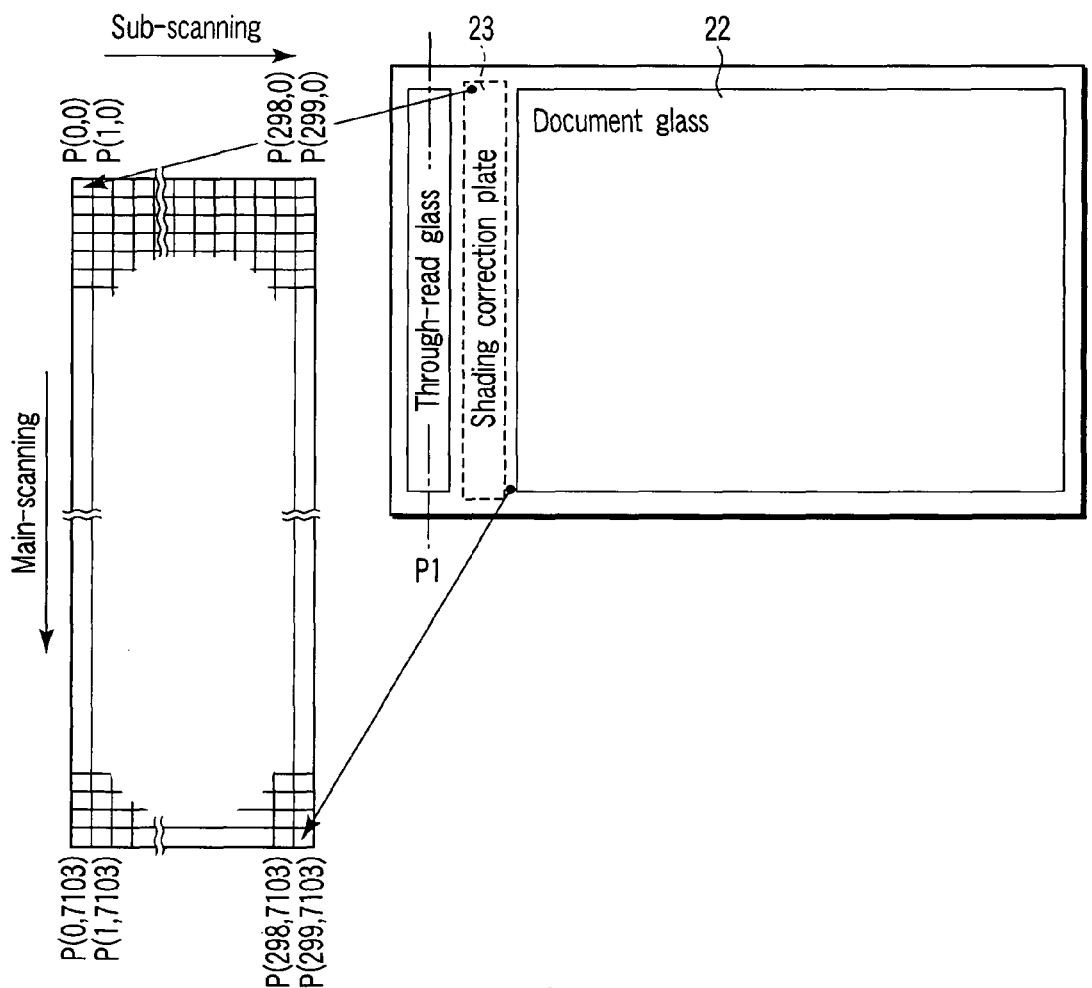
FIG. 11 is a top view of the image reading device schematically showing the arrangement of a shading correction plate and a view showing a shading correction position.

FIG. 11 is a top view of the image reading device schematically showing the arrangement of the shading correction plate and a view showing the shading correction position. Here, a through-read glass is provided at the position including the ADF original document read position P1. That is, the first carriage 16 is on standby under the through-read glass, illuminates the original document Org conveyed by the ADF 2 via the through-read glass, and causes the reflected light from the original document Org to be received by the CCD sensor 19.

The read position of the shading correction plate 23 is divided in a matrix form. It is divided from 0 to 7103 correspondingly to the number of pixels of the CCD sensor 19 in the main scanning direction. In the sub-scanning direction, it is divided from 0 to 299 correspondingly to the number of lines. Hereinafter, a position in the matrix is expressed by P (sub-scanning direction position, main scanning direction position) as shown in FIG. 11. That is, the read position of the shading correction plate 23 is represented by the two-dimensional matrix of P(0, 0) to P(299, 7103).

Figure 12:
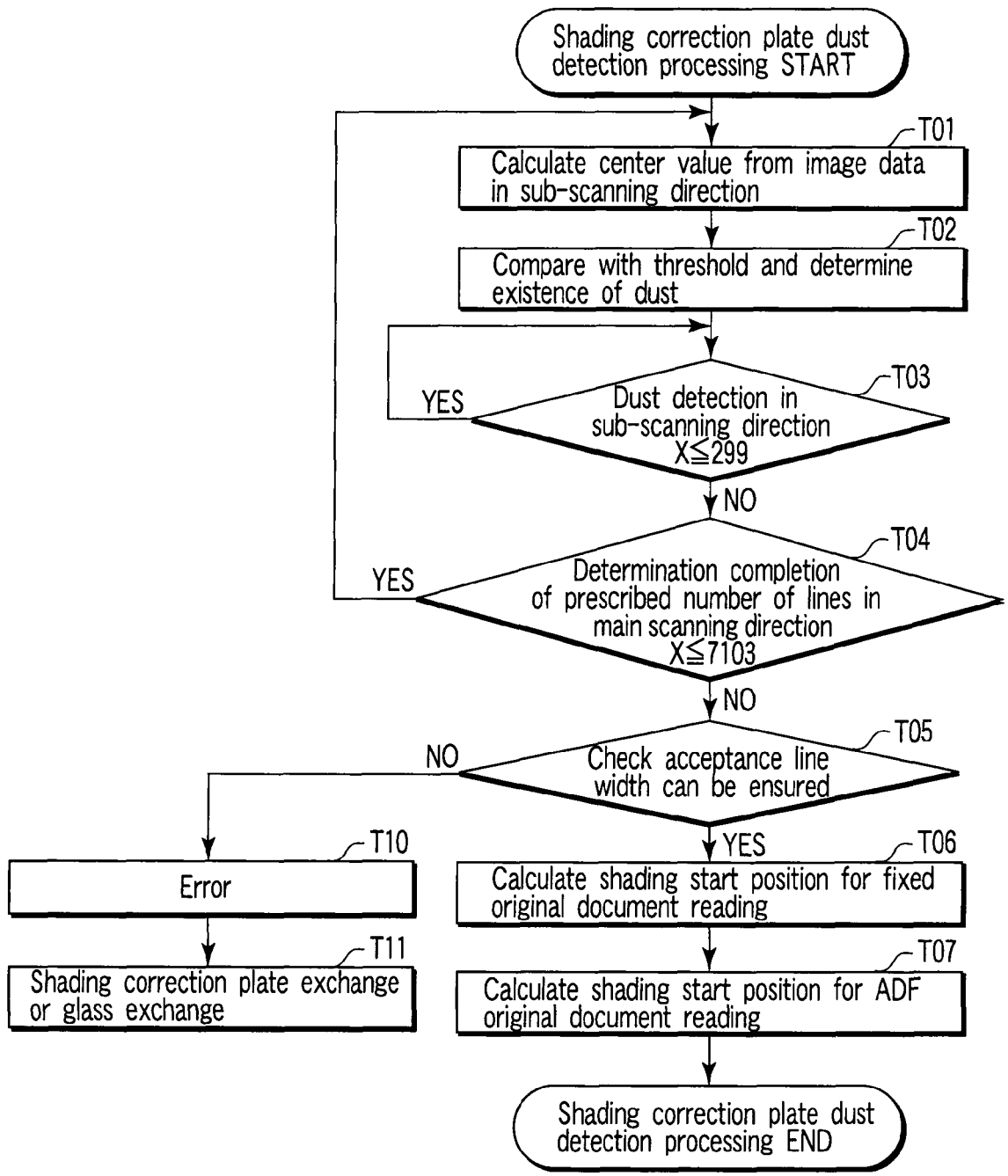
FIG. 12 is a flowchart showing the rough procedure of a shading correction plate dust detection processing.

Next, at step S02, a shading correction plate dust detection processing is executed. FIG. 12 is a flowchart showing the rough procedure of the shading correction plate dust detection processing.

At step T01, the position in the main scanning direction is made 0, and data at positions 0 to 299 in the sub-scanning direction, that is, brightness data at P(0, 0) to P(299, 0) are extracted. The brightness data are arranged from a lower value of the brightness to a higher value, and a specified number N of low brightness data are discarded. Then, the center value Median of the remaining data is obtained. Here, the specified number N of the low brightness can be set from the control panel 46 as "the number of discarded pixels with low brightness". The specified number N is stored in the RAM 62 of the image reading unit 1a.

At steps T02 and T03, the brightness data of each of P(0, 0) to P(299, 0) is compared with the center value Median. In the case where the absolute value of the difference is a specified threshold Vsh or more, it is determined that dust exists at the position, and the information is stored. Here, the threshold Vsh can be set from the control panel 46 as "threshold". The set threshold Vsh is stored in the RAM 62 of the image reading unit 1a.

Next, the main scanning direction position is incremented by one, and the processing from step T01 to step T03 is executed. After this, the foregoing operation is repeated by a prescribed number of times M in the main scanning direction. In this embodiment, the prescribed number is M=7103. At step T04, after the determination of dust existence is repeated the prescribed number of times M, this processing loop is exited and an advance is made to a next step. Here, the prescribed number of times M can be set from the control panel 46 as "prescribed number of lines in main scanning direction". The set prescribed number of times M is stored in the RAM 62 of the image reading unit 1a.

It is determined whether dust exists at each position of P(0, 0) to P(299, 7103) by the processing of from step T01 to step T04.

At step T05, it is examined whether not less than a specified number K of lines in which dust does not exist in the main scanning direction exist in the sub-scanning direction continuously. That is, it is examined whether a line width where dust does not exist can be ensured. Here, the number K can be set from the control panel 46 as "check acceptance line width". The set number K is stored in the RAM 62 of the image reading unit 1a.

Figure 13:
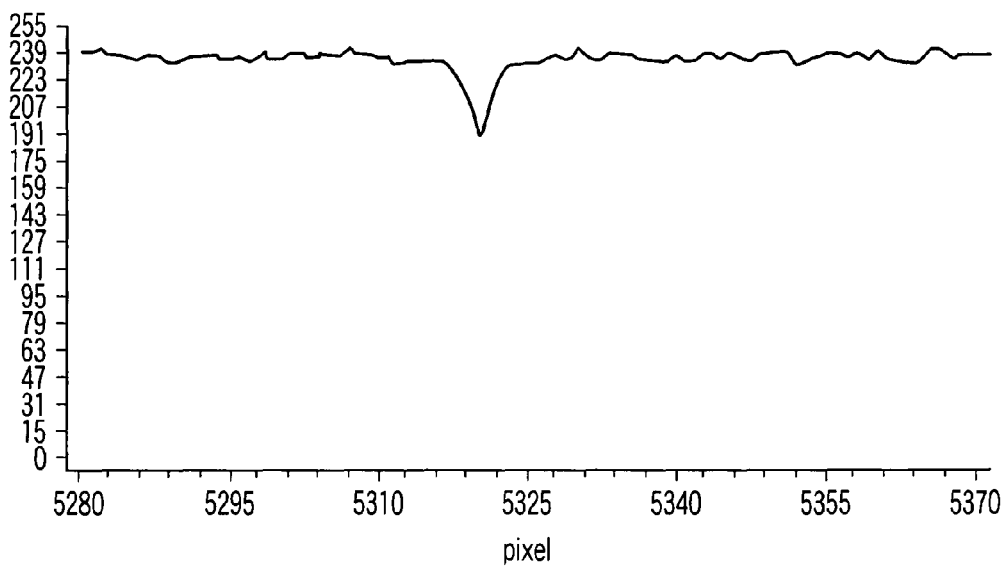
FIG. 13 is a view showing an example of brightness profile data of a case where dust exists on the shading correction plate.

FIG. 13 shows a brightness profile data example of a case where dust exists on the shading correction plate. The horizontal axis indicates the position in the main scanning direction, and the vertical axis indicates the brightness. The brightness of the vertical axis is represented in 8 bits, a brightness value=255 indicates the highest brightness, and a brightness value=0 indicates the lowest brightness.

The brightness in the vicinity of the position=5320 of the horizontal axis of the graph is reduced, and this is because dust is attached to the shading correction plate. When this data is adopted as the white reference data, when the shading correction is performed, the correction is made so as to intensify the brightness of the position, and accordingly, a white streak appears in the image.

At the foregoing step S05, a line in the main scanning direction on which the brightness is reduced as shown in FIG. 13 is removed, and a position in the sub-scanning direction is specified where a given number or more of lines with no dust exist continuously.

In the case of Yes at step T05, that is, when the width of the check acceptance line can be ensured, at step T06, the shading start position P2 for fixed original document reading is calculated. Among the ensured acceptance line bands, the acceptance line band close to the document stand glass 22 is selected, and the shading start position P2 for fixed original document reading is calculated.

At step T07, the shading start position P0 for ADF original document reading is calculated. Among the ensured acceptance line bands, the acceptance line band close to the through-read glass is selected, and the shading start position P0 for ADF original document reading is calculated.

As stated above, the shading start position P0 for ADF original document reading and the shading start position P2 for fixed original document reading are individually set in order to shorten the time from the reading of the white reference value for shading correction to the start of the scan operation.

In the case where the front surface of the shading correction plate 23 becomes the acceptance line band, the shading start position P0 for ADF original document reading and the shading start position P2 for fixed original document reading are individually set to the default values.

In the case of No at step T05, that is, when the width of the check acceptance line can not be ensured, at step T10, an error message is outputted to the control panel 46, and at step T11, a message is outputted to urge exchange of the shading correction plate or the glasses between which the shading correction plate is sandwiched.

Figure 14:
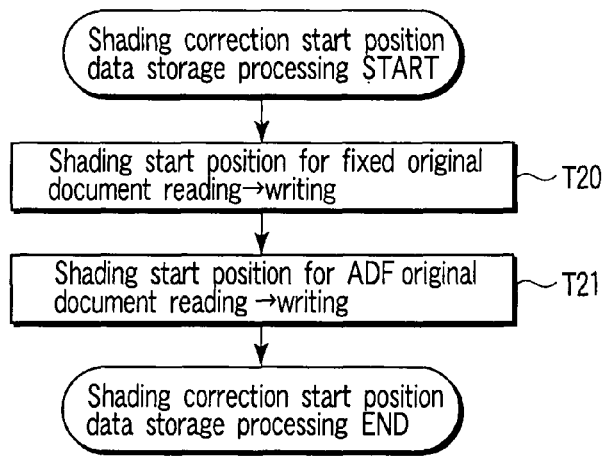
FIG. 14 is a flowchart showing the rough procedure of a shading correction start position data storage processing.

A return is made to FIG. 10, and at step S03, a shading correction start position data storage processing is executed. FIG. 14 is a flowchart showing the rough procedure of the shading correction start position data storage processing.

At step T20, the calculated shading start position P2 for fixed original document reading is stored in the ROM 63 of the image reading unit 1a. At step T21, the calculated shading start position P0 for ADF original document reading is stored in the ROM 63 of the image reading unit 1a. Incidentally, the sequence of the storage may be reversed.

Figure 15:
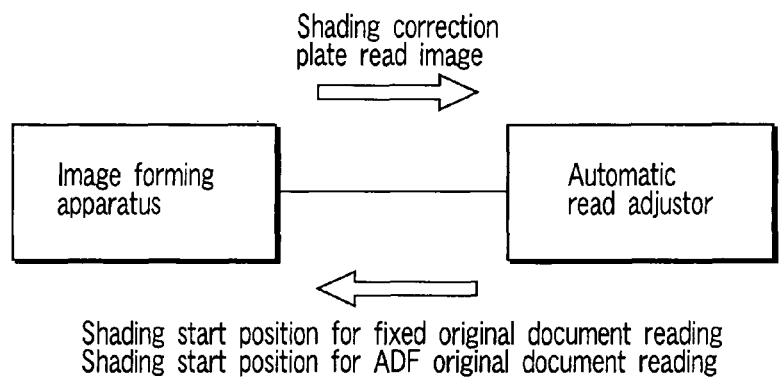
FIG. 15 is a view showing a structure of calculating a shading start position by using a read automatic adjustor.

Besides, as a mode of a variation, the shading start position P2 for fixed original document reading and the shading start position P0 for ADF original document reading are not calculated in the image forming apparatus 41, but may be calculated in an external apparatus. For example, as shown in FIG. 15, a read automatic adjustor as an external apparatus is connected to the network 42. The shading correction plate read image is transmitted from the image forming apparatus 41 to the read automatic adjustor. The read automatic adjustor calculates the shading start position P2 for fixed original document reading and the shading start position P0 for ADF original document reading, and transmits the values to the image forming apparatus 41. Incidentally, the read automatic adjustor may be constructed of the client PC 49.

Besides, the calculated values are displayed on the control panel 46, and the operator or the like may write the shading start position P2 for fixed original document reading and the shading start position P0 for ADF original document reading into the ROM 63 of the image reading unit 1a from the control panel 46.

EFFECTS OF THE EMBODIMENT

Hitherto, a shading correction plate and glasses between which it is sandwiched are checked and selected at the time of delivery. Thus, working steps for the check and selection are required, and the cost is increased. However, there is also a case where the selection can not be performed even if such check is performed. For example, since a black substance is mixed in the material itself of the shading correction plate, in the case where the substance becomes minute dust, there occurs a state where the selection can not be performed.

Hitherto, after the image reading device is assembled, it is incorporated in the image forming apparatus main body, and image confirmation is performed at the final process such as image position adjustment. In the case where a streak is confirmed in the image at this stage, it is necessary to change the shading correction start position and to confirm that the streak does not occur. Thus, the working steps of the operator are required. Besides, in the case where the automatic document feeder (ADF) is used, there is also a case where the service man confirms an image at the time of installation of the ADF, and in the case where the streak is confirmed, the shading correction start position is changed, and after it is confirmed that the streak does not occur, the delivery to the user is performed. In this case, the steps of the service man are required.

In this embodiment, based on the read image data of the shading correction plate, the shading correction start positions for fixed image and for ADF are calculated. As a result, even in the case where dust or contamination is attached to the shading correction plate, the shading correction can be made while avoiding the dust or contamination, and accordingly, the reading can be performed without reducing the picture quality.

Besides, when the foregoing operation is automatically executed, steps required in the manufacture adjustment process or the like can be reduced. Further, based on the automatically determined shading correction position, the operator or service man manually input the adjustment value and can correct the shading correction position.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus to generate image data from an original document and to form an image, comprising:

a photoelectric conversion unit configured to sequentially convert an image of the original document scanned in a sub-scanning direction into image signals made of a plurality of pixels constituting one line in a main scanning direction; a white reference plate which is white reference for the image signals; a signal determination unit configured to determine that, when a brightness signal outside a given range does not exist in image signals of one line of the white reference plate photoelectrically converted by the photoelectric conversion unit, the image signals of the line are good;

a start position specifying unit configured to specify a read start position by detecting at least one acceptance line band which is a portion of the white reference plate in the sub-scanning direction where one or more lines have been determined to be good exist continuously;

a white reference signal generation unit configured to generate a white reference signal from image signals obtained by photoelectric converting an image for one or more lines from the read start position of the white reference plate in the sub-scanning direction by the photoelectric conversion unit; and a shading correction unit configured to correct the image signals of the original document image photoelectrically converted by the photoelectric conversion unit, based on the white reference signal;

the start position specifying unit specifying an automatic document feeder (ADF) original document read start position which is the read start position for reading an ADF original document within an acceptance line band closest to a position of reading an ADF original document, and specifying a fixed original document read start position which is the read start position for reading a fixed original document within an acceptance line band closest to an original document mounting glass, when a plurality of the acceptance line bands exist.

2. The image forming apparatus according to claim 1, further comprising a storage unit configured to store the ADF original document read start position and the fixed original document read start position.

3. The image forming apparatus according to claim 2, further comprising:
an input unit configured to input an operation instruction to the image forming apparatus; and
a start position correction unit configured to update the ADF original document read start position and the fixed original document read start position stored in the storage unit based on a value inputted from the input unit.

4. The image forming apparatus according to claim 1, further comprising:
an input unit configured to input an operation instruction to the image forming apparatus; and
an operation drive unit configured to start operations of the signal determination unit and the start position specifying unit based on an input from the input unit.

5. The image forming apparatus according to claim 1, further comprising an operation drive unit configured to start operations of the signal determination unit and the start position specifying unit each time the image forming apparatus executes an image formation operation a given number of times.

6. The image forming apparatus according to claim 1, wherein the signal determination unit and the start position specifying unit are attachable to and detachable from the image forming apparatus, receives the image signal of the white reference plate photoelectrically converted by the photoelectric conversion unit through a communication line from the image forming apparatus, and transmits the specified ADF original document read start position and the fixed original document read start position to the image forming apparatus.

7. An image forming method of an image forming apparatus which includes a photoelectric conversion unit to sequentially convert an image of an original document scanned in a sub-scanning direction into image signals made of a plurality of pixels constituting one line in a main scanning direction and generates image data from the original document and forms an image, the method comprising:
arranging a white reference plate which is white reference for the image signals; determining that when a brightness signal outside a given range does not exist in image signals of one line of the white reference plate photoelectrically converted by the photoelectric conversion unit, the image signals of the line are good;
specifying a read start position by detecting at least one acceptance line band which is a portion of the white reference plate where one or more lines have been determined to be good exist continuously;
generating a white reference signal from image signals obtained by photoelectric converting an image for one or more lines from the read start position of the white reference plate in the sub-scanning direction by the photoelectric conversion unit; and
correcting the image signals of the original document image photoelectrically converted by the photoelectric conversion unit based on the white reference signal,
the specifying of the read start position specifying an automatic document feeder (ADF) original document read start position which is the read start position for reading an ADF original document within an acceptance line band closest to a position of reading an ADF original document, and specifying a fixed original document read start position which is the read start position for reading a fixed original document within an acceptance line band closest to an original document mounting glass, when a plurality of the acceptance line bands exist.

8. The image forming method according to claim 7, wherein the ADF original document read start position and the fixed original document read start position are stored in a storage unit.

9. The image forming method according to claim 8, wherein the ADF original document read start position and the fixed original document read start position stored in the storage unit are updated based on a value inputted from an input unit which inputs an operation instruction to the image forming apparatus.

10. The image forming method according to claim 7, wherein an operation for determining an image signal of one line of the white reference plate to be good and a specific operation of the read start position are started based on an input from an input unit which inputs an operation instruction to the image forming apparatus.

11. The image forming method according to claim 7, wherein an operation for determining an image signal of one line of the white reference plate to be good and a specific operation of the read start position are started each time the image forming apparatus executes an image formation operation a given number of times.

12. The image forming method according to claim 7, wherein a read start position calculation unit to execute an operation for determining an image signal of one line of the white reference plate to be good and a specific operation of the read start position is attachable to and detachable from the image forming apparatus, receives the image signal of the white reference plate photoelectrically converted by the photoelectric conversion unit through a communication line from the image forming apparatus, and transmits the specified ADF original document read start position and the fixed original document read start position to the image forming apparatus.

* * * * *